Feb. 25, 1936.  W. H. PRATT  2,032,306

POINTER MOUNTING ARRANGEMENT FOR MEASURING INSTRUMENTS

Filed Nov. 12, 1931

Inventor:
William H. Pratt,
by Charles V. Tullar
His Attorney.

Patented Feb. 25, 1936

2,032,306

UNITED STATES PATENT OFFICE 2,032,306

POINTER MOUNTING ARRANGEMENT FOR MEASURING INSTRUMENTS

William H. Pratt, Lynn, Mass., assignor to General Electric Company, a corporation of New York Application November 12, 1931, Serial No. 574,607

1 Claim. (Cl. 73—151)

My invention relates to measuring instruments and concerns particularly the mechanical construction of the moving elements of such instruments.

My invention has for its principal object the provision of indicating instruments which will not be damaged by sudden applications of energy that would tend to drive the pointer off the scale. A further object is to minimize the strains and sets and resulting errors of the instrument indications that might be caused by sudden variations in the torque acting on the moving element. Another object is to provide an arrangement which permits damping means to operate with dissimilar effects in opposite directions. Other and further objects of my invention will become apparent as the description proceeds. The features of my invention which I believe to be novel and patentable will be pointed out in the claim appended hereto.

Figure 1:
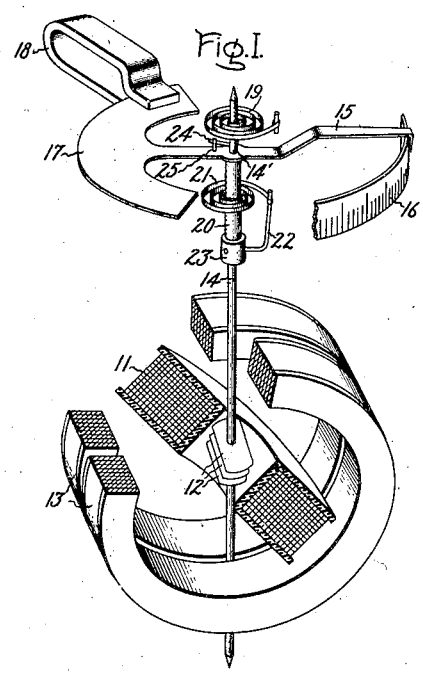
Figure 2:
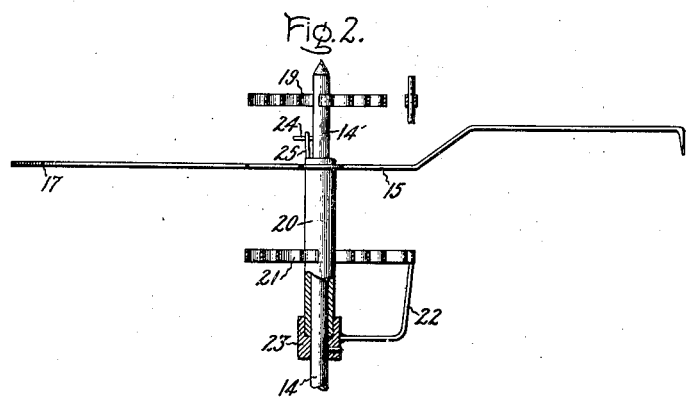

To afford a more complete understanding of my invention reference is made in the following description to the accompanying drawing in which Fig. 1 represents in perspective an instrument to which my invention has been applied and Fig. 2 represents an elevation partly in section of a portion of the arrangement shown in Fig. 1.

In order to explain the operation of my invention I have shown an arrangement in which the invention is applied to an electrical instrument of the magnetizable vane type, but it will be understood that my invention is not limited to use with such instruments and is applicable to many types of either electrical or non-electrical indicating instruments.

The instrument shown comprises a stationary current coil 11, movable magnetizable vanes 12, and magnetic shielding rings 13 and operates in a manner well understood to those skilled in the art. Shaft 14 carries the magnetizable vanes 12 and an indicating pointer 15. A suitable scale 16 may be provided to cooperate with the pointer 15. In order to damp the motion of the pointer or the moving element or both, I may provide suitable means such as a damping vane 17 attached to the pointer 15 and a damping magnet 18 cooperating with the vane 17. It will be understood however that the damping means may also be omitted, or if desired another type of damping means may be employed. In instruments of the type shown where a control spring is desirable, a control spring 19 may be attached to a suitable portion of the moving element, such as the upper end 14' of the instrument shaft.

In instruments of numerous types there is danger either of bending the pointer or straining the shaft when excessive torque is applied to the moving element as a result of connecting the instrument to measure values which will tend to drive the pointer off-scale. In order to overcome this disadvantage, the pointer 15 is mounted upon a sleeve 20 carried by the shaft 14. A yieldable connection is provided between sleeve 20 and the shaft 14 by a relatively stiff spring 21 having one end attached to the sleeve 20 and the other end attached to an arm 22 carried by the collar 23 attached by suitable means, such as riveting, to the shaft 14. In the arrangement shown, the collar 23 serves not only as a means of attaching the arm 22 but also serves to support the sleeve 20 in a given position axially with respect to the shaft 14.

When the instrument is suddenly energized so as to rotate the vanes 12 and place the shaft 14 in torsion, the yieldable connection 21 permits the pointer 15 to lag a sufficient amount behind the magnetic vanes 12 to permit forces to be transmitted more slowly from the vanes 12 to the pointer 15 thereby preventing excessive stresses. When the pointer reaches the upper limit of the scale bringing it to a stop, the vanes 12 are permitted to continue to rotate until the moving element reaches the position of equilibrium for the current flowing in 11 or until the vanes reach a position parallel to the axis of the coil 11 after which there is no further tendency for the vanes to rotate regardless of the current flowing in the coil 11. In the arrangement shown, the moving element is designed to deflect in a clockwise direction viewed from the top, but it will be understood that the invention is not limited to this exact arrangement.

Although my device will operate satisfactorily using only the parts thus far described, I find that greater precision of the readings may be obtained by providing a pin 24 attached to the shaft 14, and a pin 25 attached to the sleeve 20 which serve to fix the limit of rotation of the pointer 15 in a direction clockwise relatively to the shaft 14 thereby fixing definitely the normal relative position of shaft 14 and pointer 15. If the pins 24 and 25 are utilized it will be understood that the spring 21 is so adjusted that the pin 24 will normally be held against the pin 25 with a suitable force which need not be any exact amount. After any oscillations resulting from a sudden increase in the value of the quantity measured have died out the pointer will come to equilibrium with the pins 24 and 25 in contact and the position of the pointer will determine the reading of the scale which corresponds to the angular deflection of the vanes 12 and shaft 14. If the pins 24 and 25 are not employed it will be understood of course that the spring 21 is so adjusted that it will exert a zero force when the shaft 14 and the pointer 15 are in their normal relative position thereby biasing them to this relative position.

It will be understood that for slow up-scale deflection of the vanes 12, the pins 24 and 25 will stay together due to the tension in spring 21, and the pointer will follow the rotation of the shaft 14 the same as if rigidly secured thereto. But for sudden up-scale deflections of vanes 12 the spring 21 will yield and allow the pointer to follow more slowly, thus preventing broken and bent pointers and shafts but in no way interfering with the instrument accuracy or normal zero adjustment position of the pointer.

With the arrangement shown it will be seen that my device permits the vanes 12 to overhaul or move in advance of the pointer 15 during sudden up-scale swings and also permits the vanes 12 to overhaul the position of the damping vane 17 so that relatively strong damping means may be employed without danger of placing excessive stresses in the shaft 14. Since the pins 24 and 25 prevent the magnetic vanes 12 from overhauling the damping magnetic vane 17 during the down-scale swing, it is possible to obtain the full effect of the damping means when the pointer moves down-scale, but to obtain a modified damping action when the pointer moves up-scale.

Although I have shown an arrangement in which the pointer is carried by a bushing which in turn is rotatively yieldably connected to the shaft 14, it will be understood that I am not limited to this exact arrangement, but that my invention includes devices in which any type or rotary yieldable connection is employed between two parts of the moving element. By the expression "pointer" I mean to include recording pen pointers as well as pointers that merely indicate, and by the expression "indicating" instrument I mean to include recording instruments.

While I have described my invention as embodied in concrete form and as operating in a specific manner in accordance with the provisions of the Patent Statutes, it should be understood that I do not limit my invention thereto since various modifications thereof will suggest themselves to those skilled in the art without departing from the spirit of my invention, the scope of which is set forth in the appended claim.

What I claim as new and desire to secure by Letters Patent of the United States is:

In an indicating instrument, a moving element therefor, a shaft carrying said moving element, a control spring attached to said shaft, a sleeve surrounding said shaft, a pointer carried by said sleeve, a spring of greater stiffness than said control spring and having one end attached to said sleeve and the other end attached to said shaft, thereby serving as a yieldable connection between said sleeve and said shaft, biasing said pointer to a given position with respect to said moving element, and means preventing said pointer from overhauling said moving element in a given direction comprising a pin attached to said shaft and a second pin attached to said sleeve, said pins being in contact in the normal relative position of said sleeve with respect to said shaft to which the sleeve is biased.

WILLIAM H. PRATT.